United States Patent
Sugiura et al.

(10) Patent No.: US 7,150,913 B2
(45) Date of Patent: Dec. 19, 2006

(54) SIZING AGENT FOR CARBON FIBER, AQUEOUS DISPERSION OF THE SAME, CARBON FIBER TREATED BY SIZING, SHEET COMPRISING THE CARBON FIBER, AND CARBON FIBER-REINFORCED COMPOSITE MATERIAL

(75) Inventors: Naoki Sugiura, Ichinomiya (JP); Masato Taguchi, Nagoya (JP); Tadayoshi Saito, Nagoya (JP); Tomonori Okuda, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 301 days.

(21) Appl. No.: 10/484,493

(22) PCT Filed: Jul. 24, 2002

(86) PCT No.: PCT/JP02/07481

§ 371 (c)(1),
(2), (4) Date: Jan. 22, 2004

(87) PCT Pub. No.: WO03/010383

PCT Pub. Date: Feb. 6, 2003

(65) Prior Publication Data

US 2004/0191511 A1 Sep. 30, 2004

(30) Foreign Application Priority Data

Jul. 24, 2001 (JP) ............................. 2001-222848

(51) Int. Cl.
  *B32B 27/04* (2006.01)
  *B32B 27/38* (2006.01)
  *C08L 63/00* (2006.01)
  *D06M 15/55* (2006.01)
(52) U.S. Cl. ...................... 428/408; 428/375; 428/413; 525/524; 252/8.83
(58) Field of Classification Search .................... None
See application file for complete search history.

(56) References Cited

U.S. PATENT DOCUMENTS 3,957,716 A * 5/1976 Weldy .......................... 524/87

4,167,538 A  9/1979 Taniguchi et al.

FOREIGN PATENT DOCUMENTS

| GB | 1454424 | 9/1974 |
|---|---|---|
| GB | 2109794 | 6/1983 |
| JP | 50-59589 | 5/1975 |
| JP | 56-076448 | * 6/1981 |
| JP | 61-28074 | 2/1986 |
| JP | 63-230543 | * 9/1988 |
| JP | 7-197381 | 8/1995 |
| JP | 2000-170050 | 6/2000 |
| JP | 2001-316980 | 11/2001 |

OTHER PUBLICATIONS

Abstract of JP 56-076448, provided by the JPO website.*
Abstract of JP 63-230543, provided by the JPO website.*
U.S. Appl. No. 10/478,473, filed Nov. 21, 2003, Sugiura et al.
U.S. Appl. No. 10/484,493, filed Jan. 22, 2004, Sugiura et al.

* cited by examiner

*Primary Examiner*—Michael J. Feely
(74) *Attorney, Agent, or Firm*—Oblon, Spivak, McClelland, Maier & Neustadt, P.C.

(57) ABSTRACT

A sizing agent for carbon fiber comprising either a component (A) and a component (B), or alternatively, a component (A'), a component (B') and a component (D), each of which is described below. Component (A): an epoxy compound with at least 1 epoxy group within each molecule, and with a surface energy of 17 to 34 $mJ/m^2$; component (B): an epoxy compound with at least 1 epoxy group within each molecule, and with a surface energy of at least 35 $mJ/m^2$; component (A'): an epoxy compound with at least 2 epoxy groups within each molecule, and with a surface energy of 17 to 34 $mJ/m^2$; component (B'): an epoxy compound with at least 2 epoxy groups within each molecule, and with a surface energy of at least 35 $mJ/m^2$; and component (D): an anionic surfactant with an aryloxy group as a hydrophobic group, with an ammonium ion as a counter ion, and with an alkylene oxide addition quantity of no more than 10 moles.

16 Claims, No Drawings

SIZING AGENT FOR CARBON FIBER, AQUEOUS DISPERSION OF THE SAME, CARBON FIBER TREATED BY SIZING, SHEET COMPRISING THE CARBON FIBER, AND CARBON FIBER-REINFORCED COMPOSITE MATERIAL

TECHNICAL FIELD

The present invention relates to a sizing agent for carbon fiber, an aqueous dispersion thereof, a sized carbon fiber, a sheet material using such carbon fiber, and a carbon fiber reinforced composite material.

BACKGROUND ART

Because carbon fibers have minimal ductility and are brittle, they are prone to fuzzing caused by mechanical friction and the like, and furthermore because they also display poor wetting characteristics relative to matrix resins, when carbon fibers are used as reinforcing materials for reinforced composite materials, the excellent properties offered by the carbon fibers as a reinforcing material are unable to be manifested satisfactorily.

In order to improve these defects, carbon fibers are conventionally subjected to a sizing treatment with a sizing agent, and various compounds continue to be tested as sizing agents.

For example, Japanese Unexamined Patent Application, First Publication No. Sho 61-28074 discloses an aqueous emulsion of a bisphenol type polyalkylene ether epoxy compound produced using a small quantity of an emulsifier, which is applied to carbon fiber. Japanese Unexamined Patent Application, First Publication No. Sho 50-59589 describes the application of a solvent based solution of a sizing agent comprising a polyglycidyl ether to carbon fiber.

Sizing agents comprising the types of bisphenol type polyalkylene ether epoxy compounds described above can be used as water based emulsions, which provides extremely favorable properties in terms of industrial processability and safety, and moreover because these compounds contain a polyalkylene ether chain within the molecule, they show good compatibility with water, and because they also contain an epoxy group, they exhibit excellent adhesion to matrix resins.

However, because they contain polyalkylene ether chains, sizing agents comprising these bisphenol type polyalkylene ether epoxy compounds produce carbon fiber reinforced composite materials for which shearing characteristics is unsatisfactory. Furthermore, the heat resistance of these sizing agents is low, and it is known, for example, that even a carbon fiber reinforced composite material obtained by combining carbon fiber treated with one of these sizing agents, and a 180° C. cured epoxy resin does not display expected heat resistance performance. Furthermore, in those cases in which a non-ionic surfactant is used as an emulsifier, the non-ionic surfactant will often comprise a polyethylene oxide, and this can cause further deterioration in the heat resistance of the carbon fiber reinforced composite material.

On the other hand, the latter type of sizing agents comprising a polyglycidyl ether utilize a solvent based solution of the compound as the sizing solution, and consequently these sizing agents are inferior to the former water based sizing agents in terms of industrial processability and safety within the sizing process. In particular, sizing agents comprising a bisphenol A type glycidyl ether exhibit poor wettability with the matrix resin if absolutely no emulsifier is used, and are unable to fabricate a favorable carbon fiber reinforced composite material.

DISCLOSURE OF INVENTION

An object of the present invention is to resolve the aforementioned problems associated with the conventional technology, by providing a sizing agent for carbon fiber that is capable of producing a carbon fiber which displays favorable matrix resin impregnation, provides good adhesion within the matrix resin, and also provides stable processability and improved physical characteristics, as well as an aqueous dispersion thereof, sized carbon fiber that has undergone sizing treatment with such a sizing agent, a sheet material that uses such carbon fiber, and a carbon fiber reinforced composite material that utilizes a sized carbon fiber as a reinforcing material.

The above object is achieved by a sizing agent for carbon fiber according to the present invention, with the composition described below, and by an aqueous dispersion thereof, sized carbon fiber, and a sheet material and a carbon fiber reinforced composite material that use such carbon fiber.

In other words, a sizing agent for carbon fiber according to the present invention comprises 100 parts by weight of a component (A) and from 10 to 75 parts by weight of a component (B) described below, wherein the combined total of the component (A) and the component (B) accounts for at least 50% by weight of the combined weight of all the components:

component (A): a compound with at least 1 epoxy group within each molecule, and with a surface energy at 125° C. of 17 to 34 mJ/m$^2$; and component (B): a compound with at least 1 epoxy group within each molecule, and with a surface energy at 125° C. of at least 35 mJ/m$^2$.

The compound that constitutes the component (A) is preferably a component (A') formed from a compound with at least 2 epoxy groups within each molecule.

Furthermore, another sizing agent for carbon fiber according to the present invention comprises a component (A'), a component (B') and a component (D) described below, containing from 10 to 75 parts by weight of the component (B') per 100 parts by weight of the component (A'), wherein the combined total of the component (A') and the component (B') accounts for at least 50% by weight of the combined weight of all the components, and the component (D) accounts for 8 to 30% by weight of the combined weight of all the components:

component (A'): a compound with at least 2 epoxy groups within each molecule, and with a surface energy at 125° C. of 17 to 34 mJ/m$^2$;

component (B'): a compound with at least 2 epoxy groups within each molecule, and with a surface energy at 125° C. of at least 35 mJ/m$^2$; and component (D): an anionic surfactant with an aryloxy group as a hydrophobic group, with an ammonium ion as a counter ion, and with an alkylene oxide addition quantity of no more than 10 moles.

An aqueous dispersion of the present invention is an aqueous dispersion used for carbon fiber sizing, wherein a sizing agent for carbon fiber comprising 100 parts by weight of a component (A) and from 10 to 75 parts by weight of a component (B) described below, in which the combined total of the component (A) and the component (B) accounts for at least 50% by weight of the combined weight of all the components, is dispersed in water using a surfactant.

Component (A): a compound with at least 1 epoxy group within each molecule, and with a surface energy at 125° C. of 17 to 34 mJ/m$^2$; and Component (B): a compound with at least 1 epoxy group within each molecule, and with a surface energy at 125° C. of at least 35 mJ/m$^2$.

Furthermore, another aqueous dispersion used for carbon fiber sizing according to the present invention is formed from an aqueous dispersion wherein a sizing agent for carbon fiber comprising a component (A'), a component (B') and a component (D) described below, containing from 10 to 75 parts by weight of the component (B') per 100 parts by weight of the component (A'), in which the combined total of the component (A') and the component (B') accounts for at least 50% by weight of the combined weight of all the components, and the component (D) accounts for 8 to 30% by weight of the combined weight of all the components, is dispersed in water.

Component (A'): a compound with at least 2 epoxy groups within each molecule, and with a surface energy at 125° C. of 17 to 34 mJ/m$^2$.

Component (B'): a compound with at least 2 epoxy groups within each molecule, and with a surface energy at 125° C. of at least 35 mJ/m$^2$.

Component (D): an anionic surfactant with an aryloxy group as a hydrophobic group, with an ammonium ion as a counter ion, and with an alkylene oxide addition quantity of no more than 10 moles.

A sized carbon fiber according to the present invention is formed from carbon fiber with a sizing agent for carbon fiber bonded to the surface of the carbon fiber, wherein the sizing agent for carbon fiber comprises either (1) 100 parts by weight of a component (A) and from 10 to 75 parts by weight of a component (B) described below, wherein the combined total of the component (A) and the component (B) accounts for at least 50% by weight of the combined weight of all the components, or (2) a component (A'), a component (B') and a component (D) described below, containing from 10 to 75 parts by weight of the component (B') per 100 parts by weight of the component (A'), wherein the combined total of the component (A') and the component (B') accounts for at least 50% by weight of the combined weight of all the components, and the component (D) accounts for 8 to 30% by weight of the combined weight of all the components.

Component (A): a compound with at least 1 epoxy group within each molecule, and with a surface energy at 125° C. of 17 to 34 mJ/m$^2$; and Component (B): a compound with at least 1 epoxy group within each molecule, and with a surface energy at 125° C. of at least 35 mJ/m$^2$.

Component (A'): a compound with at least 2 epoxy groups within each molecule, and with a surface energy at 125° C. of 17 to 34 mJ/m$^2$.

Component (B'): a compound with at least 2 epoxy groups within each molecule, and with a surface energy at 125° C. of at least 35 mJ/m$^2$.

Component (D): an anionic surfactant with an aryloxy group as a hydrophobic group, with an ammonium ion as a counter ion, and with an alkylene oxide addition quantity of no more than 10 moles.

In the sized carbon fiber described above, the quantity of the sizing agent for carbon fiber bonded to the surface of the carbon fiber is preferably within a range from 0.1 to 5.0% by weight of the carbon fiber.

A sheet material using carbon fiber according to the present invention comprises a sheet material formed using the aforementioned sized carbon fiber.

In addition, a carbon fiber reinforced composite material of the present invention is formed from either a carbon fiber reinforced composite material comprising the aforementioned sized carbon fiber as a reinforcing material, or a carbon fiber reinforced composite material comprising an aforementioned sheet material, which is formed using the aforementioned sized carbon fiber, as a reinforcing material.

The aforementioned carbon fiber reinforced composite material is preferably a molded body formed using RTM (resin transfer molding), VARTM (vacuum assisted resin transfer molding), or RI (resin infusion) methods.

BEST MODE FOR CARRYING OUT THE INVENTION

A sizing agent for carbon fiber according to the present invention either (1) comprises 100 parts by weight of a component (A) formed from a compound with at least 1 epoxy group within each molecule, and with a surface energy at 125° C. of 17 to 34 mJ/m$^2$, and from 10 to 75 parts by weight of a component (B) formed from a compound with at least 1 epoxy group within each molecule, and with a surface energy at 125° C. of at least 35 mJ/m$^2$, wherein the combined total of the component (A) and the component (B) accounts for at least 50% by weight of the combined weight of all the components, or alternatively, (2) comprises 100 parts by weight of a component (A') formed from a compound with at least 2 epoxy groups within each molecule, and with a surface energy at 125° C. of 17 to 34 mJ/m$^2$, from 10 to 75 parts by weight of a component (B') formed from a compound with at least 2 epoxy groups within each molecule, and with a surface energy at 125° C. of at least 35 mJ/m$^2$, and a component (D) formed from an anionic surfactant with an aryloxy group as a hydrophobic group, with an ammonium ion as a counter ion, and with an alkylene oxide addition quantity of no more than 10 moles, wherein the combined total of the component (A') and the component (B') accounts for at least 50% by weight of the combined weight of all the components, and the component (D) accounts for 8 to 30% by weight of the combined weight of all the components.

By incorporating each of the above components in the proportions described above, a sizing agent for carbon fiber of the present invention is able to provide superior matrix resin impregnation, and by incorporating the component (A) or the component (A') formed from an epoxy compound, together with the component (B) or the component (B'), also formed from an epoxy compound, excellent interface adhesion between the carbon fiber and the matrix resin can be achieved.

In other words, a typical carbon fiber surface energy is from 40 to 50 mJ/m$^2$, and carbon fibers are more readily wet using liquids with a low surface energy.

However, the surface energies at 125° C. of the epoxy resins typically used as matrix resins are approximately 39 mJ/m$^2$ for a bisphenol A type epoxy resin, approximately 40 mJ/m$^2$ for a bisphenol F type or a phenol novolak type epoxy resin, and approximately 36 mJ/m$^2$ for a cresol novolak type epoxy resin, and in addition, it is known that during the matrix resin impregnation process, the sizing agent that is bonded to the surface of the carbon fiber dissolves, and diffuses into the matrix resin near the interface.

Under these types of conditions, by combining a component (A) or a component (A') formed from a compound with a comparatively low surface energy, and a component (B) or a component (B') formed from a compound with a similar surface energy to a typical matrix resin to form a sizing agent for carbon fiber that displays excellent wetting characteristics within a matrix resin, the extremely effective actions of both components can be combined synergistically.

In other words, when carbon fiber to which is bonded a sizing agent comprising a component (A) or a component (A') formed from a compound with a comparatively low small surface energy, and a component (B) or a component (B') formed from a compound with a similar surface energy to a typical matrix resin is impregnated with a matrix resin, the sizing agent bonded to the surface of the carbon fiber dissolves in the impregnating matrix resin, and the dissolved component (A) or the component (A') formed from a compound of low surface energy promotes spreading wetting, resulting in a rapid wetting of the surface of the carbon fiber by the matrix resin.

On the other hand, the component (B) or the component (B') formed from a compound with a similar surface energy to a typical matrix resin displays excellent co-solubility with the matrix impregnating resin, and consequently exhibits the action of promoting the dissolution of the sizing agent bonded to the surface of the carbon fiber in the impregnating matrix resin.

If the quantity of the component (B) or the component (B') is less than 10 parts by weight per 100 parts by weight of the component (A) or the component (A'), then the solubility of the sizing agent bonded to the surface of the carbon fiber in the impregnating matrix resin becomes unsatisfactory, whereas if the quantity exceeds 75 parts by weight, then the action of the sizing agent in promoting the spreading wetting of the impregnating matrix resin becomes unsatisfactory. Accordingly, the quantity of the component (B) or the component (B') is typically within a range from 10 to 75 parts by weight, and preferably from 15 to 50 parts by weight, and even more preferably from 20 to 40 parts by weight, per 100 parts by weight of the component (A) or the component (A').

If the combined total of the component (A) or the component (A'), and the component (B) or the component (B'), accounts for less than 50% by weight of the combined weight of all the components (the solid fraction components), then a satisfactory wetting promoting effect cannot be achieved. Consequently, the combined weight of the component (A) or (A') formed from an epoxy compound with a surface energy at 125° C. of 17 to 34 mJ/m$^2$, and the component (B) or (B') formed from a compound with a surface energy at 125° C. of at least 35 mJ/m$^2$ must account for at least 50% by weight of the combined weight of all the components (the solid fraction components).

Examples of the epoxy groups of the epoxy compounds that constitute the aforementioned component (A) or (A'), and the component (B) or (B'), include glycidyl groups, and cyclic aliphatic epoxy groups such as those represented by the chemical formulas (1) to (3) shown below.

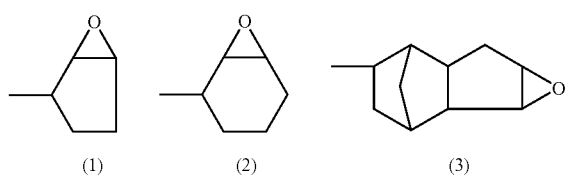

(1)　　　　(2)　　　　(3)

The compounds which make up the component (A) or (A') and the component (B) or (B') can also utilize modified epoxy compounds, in which another functional group is introduced at a portion of the epoxy groups within compounds comprising either at least 1, or at least 2 epoxy groups in each molecule. For example, epoxy compounds modified via an esterification with methacrylic acid exhibit the action of improving the interface adhesion with vinyl ester resins or unsaturated polyester resins.

The epoxy compounds of the component (A) or (A'), and the component (B) or (B'), may be used either singularly, or in mixtures of a plurality of different compounds.

In those cases in which the sizing agent for carbon fiber of the present invention also comprises a component (D) formed from an anionic surfactant with an aryloxy group as a hydrophobic group, with an ammonium ion as a counter ion, and with an alkylene oxide addition quantity of no more than 10 moles, a compound (A') with at least 2 epoxy groups within each molecule is used as the epoxy group containing compound of the component (A), and a compound (B') with at least 2 epoxy groups within each molecule is used as the epoxy group containing compound of the component (B).

This is to ensure that in those cases in which the sizing agent for carbon fiber of the present invention comprises a component (D) formed from an anionic surfactant with an aryloxy group as a hydrophobic group, with an ammonium ion as a counter ion, and with an alkylene oxide addition quantity of no more than 10 moles, the characteristics of the component (D) formed from this anionic surfactant, namely the characteristics of a component (D) formed from an anionic surfactant in which the alkylene oxide addition quantity is restricted to no more than 10 moles to ensure, as described below, that the component does not cause a reduction in the heat resistance of the product carbon fiber reinforced composite material, are readily exhibited, enabling excellent heat resistance to be retained for the product carbon fiber reinforced composite material.

In other words, by using, as the epoxy compounds, a component (A') that is formed from a compound with at least 2 epoxy groups within each molecule, and a component (B') that is also formed from a compound with at least 2 epoxy groups within each molecule, a mechanism is adopted wherein following impregnation by the matrix resin, after each of these compounds has dissolved and diffused into the matrix resin, during the subsequent curing reaction of the matrix resin, the compounds that constitute the component (A') and the component (B') act as cross linking molecules, due to their containing at least 2 epoxy groups within each molecule, and are hence incorporated within the matrix resin, ensuring that the product carbon fiber reinforced composite material suffers no reduction in heat resistance.

Examples of the compounds that constitute the component (A) or the component (A') used in a sizing agent for carbon fiber according to the present invention include the following compounds.

(1) Compounds Containing 1 Epoxy Group within Each Molecule

Compounds in which one terminal glycidyl group of a cyclopentadiene type epoxy resin has been modified, compounds in which one terminal glycidyl group of diglycidyl ether of an adduct of 4,4'-(1-methylethylidene)bis(Phenol) with 2 mols of oxirane has been modified, and 2-ethylhexyl glycidyl ether and the like.

(2) Compounds Containing at least 2 Epoxy Groups within each Molecule Dicyclopentadiene type epoxy resins (Epiclon HP-7200 series, manufactured by Dainippon Ink and Chemicals, Inc.), trishydroxyphenylmethane type epoxy resins (Epikote 1032H60, 1032S50, manufactured by Japan Epoxy Resins Co., Ltd.), DPP novolak type epoxy resins (Epikote 157S65, 157S70, manufactured by Japan Epoxy Resins Co., Ltd.), hydrogenated bisphenol A diglycidyl ethers (Epolight 4000, manufactured by Kyoeisha Chemical Co., Ltd.), and diglycidyl ether of an adduct of 4,4'-(1-methylethylidene)bis(Phenol) with 2 mols of oxirane (Epolight 3002, manufactured by Kyoeisha Chemical Co., Ltd.) and the like.

Of these, dicyclopentadiene type epoxy resins, trishydroxyphenylmethane type epoxy resins, DPP novolak type epoxy resins, and diglycidyl ether of an adduct of 4,4'-(1-methylethylidene)bis(Phenol) with 2 mols of oxirane are ideal, as because they contain an aromatic group within the compound structure, no deterioration occurs in the heat resistance of the product carbon fiber reinforced composite material. Furthermore, as described above, a compound with 1 epoxy group within each molecule can be used as the component (A), although using a component (A') formed from a compound with at least 2 epoxy groups within each molecule produces a greater improvement in the interface adhesion with the matrix resin, and consequently the use of a component (A') formed from a compound with at least 2 epoxy groups within each molecule is preferred.

On the other hand, examples of the compounds that constitute the component (B) or the component (B') include the following compounds.

(1) Compounds Containing 1 Epoxy Group within Each Molecule

Compounds in which one terminal of a bisphenol A type epoxy resin (Epikote 828, manufactured by Japan Epoxy Resins Co., Ltd.) has been modified with a methacrylate ester, and the like.

(2) Compounds Containing at Least 2 Epoxy Groups within Each Molecule

Bisphenol A type epoxy resins, bisphenol F type epoxy resins, phenol novolak type epoxy resins, cresol novolak type epoxy resins, biphenyl type epoxy resins, and naphthalene type epoxy resins.

As described above, a compound with 1 epoxy group within each molecule can be used as the component (B). However, using a component (B') formed from a compound with at least 2 epoxy groups within each molecule produces a greater improvement in the interface adhesion with the matrix resin, in a similar manner to the component (A'). Consequently, the use of a component (B') formed from a compound with at least 2 epoxy groups within each molecule is preferred.

The component (D) used in a sizing agent for carbon fiber according to the present invention is an anionic surfactant with an aryloxy group as a hydrophobic group, with an ammonium ion as a counter ion, and with an alkylene oxide addition quantity of no more than 10 moles, and by adding this type of anionic surfactant, a product can be obtained with excellent interface adhesion with the matrix resin, and the heat resistance of a carbon fiber reinforced composite material produced using a heat resistant resin as the matrix resin can be prevented from decreasing.

If the content of the component (D) within a carbon fiber sizing agent of the present invention that comprises such a component (D) is less than 8% by weight of the combined weight of all the components (the solid fraction components), then the stability of an aqueous dispersion for sizing produced from this sizing agent deteriorates, whereas if the content exceeds 30% by weight, the sizing effect of the sizing agent deteriorates.

Accordingly, in a carbon fiber sizing agent of the present invention that comprises a component (D), the content of the anionic surfactant with an aryloxy group as a hydrophobic group, with an ammonium ion as a counter ion, and with an alkylene oxide addition quantity of no more than 10 moles, which constitutes the component (D) must account for 8 to 30% by weight of the combined weight of all the components (the solid fraction components) of the sizing agent, and preferably accounts for 10 to 25.0% by weight of the combined weight of all the components.

Conventionally, the types of nonionic surfactant employed as the emulsifiers used to emulsify an epoxy resin that is to form a matrix resin comprise comparatively long ethylene oxide chains within the molecule, in order to achieve the required emulsion stability. However, the long ethylene oxide chains of these nonionic surfactants are a primary cause of the reduction in the heat resistance of carbon fiber reinforced composite materials. On the other hand, nonionic surfactants with short ethylene oxide chains display only a minor reduction effect on the heat resistance, but do not provide the required emulsifying action.

In contrast, anionic surfactants with ionic properties do not rely on an ethylene oxide chain for their emulsifying action, yet display satisfactory levels of emulsifying action.

Accordingly, the component (D) within a sizing agent for carbon fiber according to the present invention uses an anionic surfactant in which the alkylene oxide addition quantity is no more than 10 moles, to ensure that the component does not cause a reduction in the heat resistance of the product carbon fiber reinforced composite material.

Furthermore, the anionic surfactant that constitutes the component (D) must have an ammonium ion as the counter ion. The reason for this requirement is that in anionic surfactants in which the counter ion is an alkali metal ion or an alkali earth metal ion, these alkali metal ions or alkali earth metal ions can become mixed in with the product carbon fiber reinforced composite material, causing a reduction in the thermal stability of the product.

In addition, the hydrophobic group of the anionic surfactant that constitutes the aforementioned component (D) must be an aryloxy group. Namely, in many instances an epoxy resin with aromatic rings within the skeleton is used as the matrix resin in order to produce a carbon fiber reinforced composite material with good heat resistance, and an anionic surfactant in which the hydrophobic group is an aryloxy group displays better co-solubility with such epoxy resins containing aromatic rings within the skeleton than an anionic surfactant in which the hydrophobic group is an aliphatic group, and consequently enables the production of a carbon fiber reinforced composite material with superior mechanical characteristics and heat resistance.

Examples of suitable anionic surfactant of the aforementioned component (D) include carboxylates, sulfate esters, sulfonates, and phosphate esters and the like. Of these, anionic surfactants of the component (D) formed from sulfate esters or sulfonates display an excellent emulsifying action for epoxy resins, and are consequently preferred.

Examples of sulfate esters that can be used as the anionic surfactant that constitutes the component (D) include alkylbenzene polyethylene glycol ether sulfate esters and polycyclic phenyl ether polyethylene glycol ether sulfate esters, as well as compounds in which a portion of the polyethylene oxide chain within an alkylbenzene polyethylene glycol ether sulfate ester or a polycyclic phenyl ether polyethylene glycol ether sulfate ester contains propylene oxide units in either a random or block-type arrangement.

Examples of the aforementioned sulfonate esters that can be used as the anionic surfactant that constitutes the component (D) include alkylbenzene sulfonates, alkylnaphthalene sulfonates, and polycyclic phenyl ether sulfonates.

In a sizing agent for carbon fiber according to the present invention, components other than the aforementioned component (A) or (A'), the component (B) or (B'), and the component (D) are added in quantities that will not impair the actions exhibited by the carbon fiber sizing agent, and examples of these other components include ester compounds, urethane compounds, polyamide compounds, and polyimide compounds.

Nonionic surfactants can also be added to a sizing agent for carbon fiber of the present invention, and for example, aliphatic nonionic and phenol based nonionic surfactants can be used. Examples of suitable aliphatic nonionic surfactants include higher alcohol ethylene oxide adducts, fatty acid ethylene oxide adducts, higher alcohol fatty acid ester ethylene oxide adducts, glycerol fatty acid esters, fatty acid esters of sorbitol and sorbitan, and fatty acid esters of pentaerythritol. Furthermore, examples of suitable phenol based nonionic surfactants include alkylphenol based nonionic compounds and polycyclic phenol based nonionic compounds.

In the case of the ethylene oxide adducts described above as suitable nonionic surfactants, adducts in which a portion of the polyethylene oxide chain contains propylene oxide units in either a random or a block-type arrangement are preferred. The fatty acid ethylene oxide adducts and the higher alcohol fatty acid ester ethylene oxide adducts can utilize mono-ester type, di-ester type, tri-ester type or tetra-ester type nonionic surfactants.

Sizing of carbon fiber using a sizing agent for carbon fiber according to the present invention is preferably conducted using an aqueous dispersion of the sizing agent.

An aqueous dispersion of a sizing agent for carbon fiber of the present invention is used for conducting sizing of the carbon fiber, and is formed from an aqueous dispersion produced by dispersing in water, using a surfactant, a sizing agent for carbon fiber comprising 100 parts by weight of an epoxy compound of the component (A) and from 10 to 75 parts by weight of an epoxy compound of the component (B), in which the combined total of the component (A) and the component (B) accounts for at least 50% by weight of the combined weight of all the components.

In a preferred configuration, an aqueous dispersion of a sizing agent for carbon fiber of the present invention is formed from an aqueous dispersion produced by dispersing in water, using a surfactant, a sizing agent for carbon fiber comprising 100 parts by weight of an epoxy compound of the component (A'), from 10 to 75 parts by weight of an epoxy compound of the component (B'), and a component (D) formed from an anionic surfactant with an aryloxy group as a hydrophobic group, with an ammonium ion as a counter ion, and with an alkylene oxide addition quantity of no more than 10 moles, wherein the combined total of the component (A') and the component (B') accounts for at least 50% by weight of the combined weight of all the components, and the component (D) accounts for 8 to 30% by weight of the combined weight of all the components.

Particularly in the case of an aqueous dispersion that uses a component (D) formed from an anionic surfactant with an aryloxy group as a hydrophobic group, with an ammonium ion as a counter ion, and with an alkylene oxide addition quantity of no more than 10 moles, the epoxy compound of the component (A') and the epoxy compound of the component (B') can be dispersed in the water in a stable manner, producing favorable dispersion stability, and thus yielding an aqueous dispersion with good handling characteristics.

Typically, during application to carbon fiber, the sizing agent for carbon fiber is used as either a dispersion or a solution, in either water or an organic solvent such as acetone, although using the sizing agent as a dispersion in water is superior to the case of dispersion or dissolution in an organic solvent, both industrially and from a safety perspective.

Sized carbon fiber of the present invention refers to carbon fiber in which an aforementioned sizing agent for carbon fiber of the present invention is bonded to the surface of the carbon fiber. In order to enable the sizing treatment to produce a carbon fiber with excellent bindability and abrasion resistance, and satisfactorily improve the wetting characteristics relative to the matrix resin and the interface adhesion with the matrix resin, and provide the product carbon fiber reinforced composite material with favorable mechanical characteristics, from 0.1 to 5.0% by weight of the sizing agent is preferably bonded to the carbon fiber relative to the weight of the carbon fiber, and quantities from 0.2 to 3.0% by weight are even more desirable.

The carbon fiber subjected to sizing treatment may be obtained from any raw material including pitch systems, rayon systems or polyacrylonitrile systems, and high strength type fibers (low elastic modulus carbon fiber), medium-high elasticity carbon fibers, or ultra high elasticity carbon fibers are suitable.

The sizing of carbon fiber using a sizing agent for carbon fiber according to the present invention can be conducted by applying the sizing agent for carbon fiber, or an aqueous dispersion of the sizing agent for carbon fiber, to the carbon fiber using a roller immersion method or a roller contact method or the like, and then drying the fibers. Adjustment of the quantity of the sizing agent applied to the surface of the carbon fiber can be achieved by either adjusting the concentration of the sizing agent liquid, or adjusting the level of squeezing. The drying process can be conducted using hot air, a hot plate, a heated roller, or any of a variety of infrared heaters.

Sized carbon fiber of the present invention comprises an aforementioned sizing agent for carbon fiber according to the present invention bonded to the surface of the carbon fiber, and consequently fuzzing and the like due to mechanical friction is minimized, and the wetting and adhesion of the carbon fiber relative to matrix resins is excellent.

Sized carbon fiber of the present invention displays excellent processability including in terms of weaving and cutting and the like, and can be easily processed into sheet materials such as woven cloth, unidirectionally aligned sheets, unwoven cloth, and mats. Particularly during the weaving process, typical carbon fiber is prone to fuzzing due to abrasion, but in the case of sized carbon fiber of the present invention, the sizing agent bonded to the surface of the carbon fiber effectively suppresses such fuzzing.

A sheet material that uses a sized carbon fiber according to the present invention can comprise woven cloth, unidirectionally aligned sheets, unwoven cloth, and mats. In the case of woven cloth, there are no particular restrictions on the weave system employed, and plain weave, twill weave, satin weave or modifications of these weave systems are all possible, and systems in which both the weft and the warp are sized carbon fiber are acceptable, as are mixed weaves containing other carbon fibers or different fibers other than carbon fiber. Examples of suitable different fibers other than carbon fiber include inorganic fibers such as glass fiber, tilano fiber and SiC fiber, as well as organic fibers such as aramid, polyester, PP, nylon, polyimide and vinylon.

A carbon fiber reinforced composite material of the present invention is a material that has been formed using sized carbon fiber, comprising a sizing agent for carbon fiber according to the present invention bonded to the surface of the fiber, as a reinforcing material, and is produced by curing and molding a unidirectional prepreg, a cross prepreg, a towpreg, a short fiber reinforced resin impregnated sheet, or a short fiber mat reinforced resin impregnated sheet or the like, which has been produced using a reinforcing material impregnated with a matrix resin.

Examples of suitable matrix resins for impregnating the reinforcing material include epoxy resins, radical polymerization type resins such as acrylic resins, vinyl ester resins and unsaturated polyester resins, thermoplastic acrylic resins, and phenol resins.

The reinforcing material impregnated with matrix resin that is supplied to the curing and molding process to produce the aforementioned carbon fiber reinforced composite material can be obtained using normal methods such as hot melt methods, solvent based methods, syrup methods, or thickened resin methods used for sheet molding compounds (SMC).

A carbon fiber reinforced composite material of the present invention is formed using a sized carbon fiber, which has been treated with an aforementioned sizing agent, as the reinforcing material, and either a radical polymerization type resin such as an epoxy resin, an acrylic resin, an unsaturated polyester resin or a vinyl ester resin, or a phenol resin as the matrix resin. This carbon fiber and matrix resin combination displays excellent impregnation properties, and exhibits strong interface adhesion between the carbon fiber and the matrix resin, and consequently a carbon fiber reinforced composite material of the present invention displays favorable mechanical characteristics.

In addition, a carbon fiber reinforced composite material of the present invention utilizes a sized carbon fiber which, as described above, displays excellent impregnation by matrix resins, and also causes a manifestation of heat resistance in the carbon fiber reinforced composite material, and consequently, the composite material is ideal as a carbon fiber reinforced composite material for forming large scale molded bodies in fields such as the construction field and the aerospace field, and moreover also displays good suitability to curing and molding processes using RTM (resin transfer molding), VARTM (vacuum assisted resin transfer molding), or RI (resin infusion) methods, thus enabling the molding of cured molded bodies with excellent mechanical properties, under conditions of high productivity.

EXAMPLES

As follows is a description of specific configurations of a sizing agent for carbon fiber according to the present invention, an aqueous dispersion thereof, a sized carbon fiber, a sheet material using such carbon fiber, and a carbon fiber reinforced composite material, based on series of examples.

Measurements of the surface energy of epoxy compounds at 125° C., evaluations of the co-solubility of surfactants and epoxy resins, and evaluations of the heat resistance of epoxy resin molded bodies containing an added surfactant were conducted in the manner described below.

(1) Measurement of Surface Energy of Epoxy Compounds at 125° C.

An H type thermostat (manufactured by Kyowa Interface Science Co., Ltd.) was attached to an automatic surface tension meter (CBVP-A3, manufactured by Kyowa Interface Science Co., Ltd.), and the surface energy of the epoxy compound was measured 3 times on a platinum plate, using a Wilhelmi method, and the average value was recorded. The results are shown in Table 1.

TABLE 1

| Compound name | Trade name | Surface energy (mJ/m$^2$) |
| --- | --- | --- |
| Dicyclopentadiene type epoxy resin | Epiclon HP7200 | 21.6 |
| diglycidyl ether of an adduct of 4,4'-(1-methylethylidene)bis(Phenol) with 2 mols of oxirane | Epolight 3002 | 32.2 |
| Hydrogenated bisphenol A diglycidyl ether | Epolight 4000 | 33.7 |
| Bisphenol A type epoxy resin | Epikote 828 | 38.5 |
| Bisphenol F type epoxy resin | Epikote 807 | 40.1 |
| Bisphenol A type epoxy resin | Epikote 1001 | 37.5 |
| Phenol novolak type epoxy resin | Epiclon N740 | 40.2 |
| Cresol novolak type epoxy resin | Epiclon N673 | 36.2 |

(2) Evaluations of Co-solubility of Surfactants and Epoxy resins, and Evaluations of the Heat Resistance of Epoxy Resin Molded Bodies Containing added Surfactant Following the generation of a resin composition by taking a 180° C. cured type epoxy resin #410 (manufactured by Mitsubishi Rayon Co., Ltd.) and adding a surfactant in a quantity equivalent to 1.6% by weight of the quantity of the epoxy resin, a cured resin sheet formed by curing this resin composition was evaluated for transparency based on its external appearance, and the co-solubility of the surfactant and the epoxy resin was evaluated by measuring the bending elastic modulus (3 point bending test) retention of the cured resin sheet at room temperature. The results are shown in Table 2. In Table 2, the evaluations of the co-solubility are reported as O for a good result, and x for an unsatisfactory result.

TABLE 2

| Surfactant | Transparency | Elastic modulus retention (MPa) | Evaluation |
| --- | --- | --- | --- |
| Blank | transparent | 3840 | — |
| Aliphatic based nonionic | | | |
| pluronic type (F88) | turbid | 3510 | x |
| hardened castor oil ether | turbid | 3550 | x |
| Phenol based nonionic | | | |
| nonylphenol ethylene oxide 5 mol adduct | transparent | 3710 | o |
| nonylphenol ethylene oxide 12 mol adduct | transparent | 3760 | o |
| nonylphenol ethylene oxide 40 mol adduct | transparent | 3710 | o |
| nonylphenol ethylene oxide 50 mol adduct | transparent | 3650 | o |
| Phenol based anionic | | | |
| ammonium salt of nonylphenol ethylene oxide 6 mol adduct sulfate ester | transparent | 3660 | o |
| ammonium salt of nonylphenol ethylene oxide 10 mol adduct sulfate ester | transparent | 3820 | o |
| ammonium salt of nonylphenol ethylene oxide 30 mol adduct sulfate ester | transparent | 3730 | o |
| ammonium salt of polycyclic phenol ethylene oxide 7 mol | transparent | 3850 | o |

TABLE 2-continued

| Surfactant | Transparency | Elastic modulus retention (MPa) | Evaluation |
|---|---|---|---|
| adduct sulfate ester (Newcol 707SF) | | | |

Furthermore, the modulus of shearing elasticity under rising temperature for a test piece cut from the above cured resin sheet was measured using a viscoelasticity spectrometer RDA-700 (manufactured by Rheometrics Co., Ltd.), and from the G'-Tg value (the glass transition temperature obtained from the curve showing the temperature dependency of the storage elastic modulus G') read from the thus obtained chart, and the value of G' at 180° C., the heat resistance of the epoxy resin molded body containing added surfactant was evaluated. The results are shown in Table 3.

TABLE 3

| Surfactant | Tg (° C.) | G' (180° C.) (MPa) | Evaluation |
|---|---|---|---|
| Blank | 194 | 1070 | — |
| Aliphatic based nonionic | | | |
| pluronic type (F88) | 193 | 930 | x |
| hardened castor oil ether | 192 | 960 | x |
| Phenol based nonionic | | | |
| nonylphenol ethylene oxide 5 mol adduct | 192 | 1020 | x |
| nonylphenol ethylene oxide 12 mol adduct | 190 | 1020 | x |
| nonylphenol ethylene oxide 40 mol adduct | 193 | 1010 | x |
| nonylphenol ethylene oxide 50 mol adduct | 185 | 950 | x |
| Phenol based anionic | | | |
| ammonium salt of nonylphenol ethylene oxide 6 mol adduct sulfate ester | 200 | 1090 | o |
| ammonium salt of nonylphenol ethylene oxide 10 mol adduct sulfate ester | 200 | 1110 | o |
| ammonium salt of nonylphenol ethylene oxide 30 mol adduct sulfate ester | 194 | 1000 | x |
| ammonium salt of polycyclic phenol ethylene oxide 7 mol adduct sulfate ester (Newcol 707SF) | 201 | 1070 | o |

Example 1 to Example 6, Comparative Example 1 to Comparative Example 4

Using the compounds shown in Table 4, each of the components shown in Table 5 through Table 7 (parts by weight) were combined, thereby preparing sizing agents for carbon fiber according to the examples of the present invention, as well as sizing agents for comparative purposes.

Example 7 to Example 12, Comparative Example 5 to Comparative Example 8

Aqueous dispersions of each of the sizing agents prepared in the above examples 1 to 6 and the comparative examples 1 to 5 were prepared by phase inversion emulsification of the sizing agents. The sizing agent concentration (% by weight) of each of the sizing agent aqueous dispersions is recorded in Table 5 through Table 7.

Example 13 to Example 18, Comparative Example 9 to Comparative Example 12

A carbon fiber bundle with no applied sizing agent (Pyrofil TR50SX, manufactured by Mitsubishi Rayon Co., Ltd., number of filaments 12,000, strand strength 5,000 MPa, strand elastic modulus 242 GPa) was immersed in an immersion tank with a free roller filled with an aqueous dispersion of a sizing agent prepared in one of the above examples 7 to 12, or the comparative examples 5 to 8, and subsequently subjected to hot air drying, and winding onto a bobbin, thereby yielding a bobbin wound sized carbon fiber.

The quantity of sizing agent bonded to the surface of the sized carbon fiber, and the performance of the sizing agent aqueous dispersion in the above sizing process are recorded in Table 5 through Table 7. Evaluation of the performance of the sizing agent aqueous dispersion in the sizing process was recorded as O if the resin did not adhere to the surface of the immersion roller, and the emulsion stability was good, and recorded as x if there was slight adhesion of the resin to the surface of the immersion roller, and the emulsion stability was also unsatisfactory.

Example 19 to Example 24, Comparative Example 13 to Comparative Example 16

156 strands of a carbon fiber bundle unwound from a bobbin obtained in one of the examples 13 to 18 or the comparative examples 9 to 12 were positioned in an aligned manner on the epoxy resin applied surface of a release sheet which had been coated with a matrix resin formed from 2 types of B-stage epoxy resins (Mitsubishi Rayon Co., Ltd., #350, a 130° C. curing type resin; and #410a 180° C. curing type resin), and the sheet was then passed through a thermocompression roller to impregnate the carbon fiber bundle with the epoxy resin, and a protective film was then laminated on top, thereby completing preparation of a unidirectionally aligned (UD) prepreg with a resin content of approximately 33% by weight, a carbon fiber a real weight of 250 g/m$^2$, and a width of 500 mm.

The performance of the unwinding of the carbon fiber bundle from the bobbin during production of the above UD prepreg is recorded in Table 5 through Table 7, together with the type of matrix resin used. The evaluation of the unwinding performance of the carbon fiber bundle from the bobbin was recorded as O if the unwinding was favorable, fuzzing did not occur, opening property was good, and the resin did not adhere to the abrasion bar, and was recorded as x if fiber breakage occurred during unwinding, fuzzing occurred, sections of opening occurred, or the resin adhered to the abrasion bar.

In addition, the external appearance of the above UD prepreg, and the absorption of the resin when the protective film was removed from the UD prepreg (=an indication of the resin impregnation) were recorded in Table 5 through Table 7, either as O if no colored sections caused by non-impregnated sections were visible, the surface smoothness was favorable, and the resin absorption was also favorable; or as x if no colored sections caused by non-impregnated sections were visible and the surface smoothness was favorable, but the absorption of the resin was gradual.

Subsequently, by curing and molding a UD laminated sheet of thickness 2 mm prepared from the above UD prepreg, a laminated sheet was prepared as a carbon fiber reinforced composite material.

The interface adhesion between the carbon fiber and the matrix resin in the thus obtained laminated sheet, which represents a carbon fiber reinforced composite material, was evaluated by measuring the 90° bending strength of the laminated sheet (in accordance with ASTM-D-790). The results are shown in Table 5 through Table 7.

In addition, test pieces were cut from the aforementioned laminated sheet produced using the sizing agents prepared in the example 3 and the comparative example 2, as 0° UD materials of the laminated sheet, and the modulus of shearing elasticity under rising temperature was measured using a viscoelasticity spectrometer RDA-700 (manufactured by Rheometrics Co., Ltd.). The heat resistance of the laminated sheet was then evaluated using the G'-Tg value read from the thus obtained chart. The results are shown in Table 5 through Table 7.

TABLE 4

| Component | Trade name | Compound name |
|---|---|---|
| (A') | Epiclon HP7200 (Dainippon Ink and Chemicals, Inc.) | dicyclopentadiene type epoxy resin |
| | Epolight 4000 | hydrogenated bisphenol A diglycidyl ether |
| (B') | Epikote 828 Japan Epoxy Resins Co., Ltd. | bisphenol A type epoxy resin |
| | Epikote 1001 Japan Epoxy Resins Co., Ltd. | bisphenol A type epoxy resin |
| | Epikote 807 Japan Epoxy Resins Co., Ltd. | bisphenol F type epoxy resin |
| | Epiclon N740 (Dainippon Ink and Chemicals, Inc.) | phenol novolak type epoxy resin |
| (D) | Newcol 707SF Nippon Nyukazai Co., Ltd. | ammonium salt of polycyclic phenol ethylene oxide 7 mol adduct sulfate ester |
| Other | ISEO (Aoki Oil Industrial Co., Ltd.) | isostearyl alcohol ethylene oxide 6 mol adduct |
| | Pluronic F88 Asahi Denka Co., Ltd. | Pluronic type surfactant |

TABLE 5

| Composition (parts by weight) | Example 1 | Example 2 | Example 3 |
|---|---|---|---|
| (A') | | | |
| Epiclon HP7200 | 60 | 60 | 60 |
| Epolight 4000 | | | |
| (B') | | | |
| Epikote 828 | | | |
| Epikote 1001 | | | |
| Epikote 807 | 20 | 22 | 22 |
| Epiclon N740 | | | |
| (D) | | | |
| Newcol 707SF | | 15 | 15 |
| Other | | | |
| ISEO | | 3 | 3 |
| Pluronic F88 | 20 | | |
| Concentration of sizing agent aqueous dispersion (% by weight) | 2.2 | 2.1 | 2.1 |
| Quantity of sizing agent bonded to carbon fiber (% by weight) | 1.1 | 1.0 | 1.0 |
| Performance of sizing agent aqueous dispersion during sizing | ○ | ○ | ○ |
| Type of matrix resin | #350 | #350 | #410 |
| Performance of carbon fiber bundle during prepreg production | ○ | ○ | ○ |
| External appearance of prepreg and absorption of resin | ○ | ○ | ○ |
| 90° bending strength of laminated sheet (MPa) | 149 | 150 | 148 |
| Heat resistance of laminated sheet: G'-Tg (° C.) | 122 | 124 | 203 |

TABLE 6

| Composition (parts by weight) | Example 4 | Example 5 | Example 6 |
|---|---|---|---|
| (A') | | | |
| Epiclon HP7200 | | 55 | |
| Epolight 4000 | 60 | | 50 |
| (B') | | | |
| Epikote 828 | 22 | 27 | |
| Epikote 1001 | | | |
| Epikote 807 | | | |
| Epiclon N740 | | | 32 |
| (D) | | | |
| Newcol 707SF | 15 | 15 | 15 |
| Other | | | |
| ISEO | 3 | 3 | 3 |
| Pluronic F88 | | | |
| Concentration of sizing agent aqueous dispersion (% by weight) | 2.0 | 2.3 | 2.3 |
| Quantity of sizing agent bonded to carbon fiber (% by weight) | 0.9 | 1.1 | 1.2 |
| Performance of sizing agent aqueous dispersion during sizing | ○ | ○ | ○ |
| Type of matrix resin | #350 | #350 | #350 |
| Performance of carbon fiber bundle during prepreg production | ○ | ○ | ○ |
| External appearance of prepreg and absorption of resin | ○ | ○ | ○ |
| 90° bending strength of laminated sheet (MPa) | 145 | 146 | 147 |
| Heat resistance of laminated sheet: G'-Tg (° C.) | 121 | 123 | 122 |

TABLE 7

| Composition (parts by weight) | Comparative example 1 | Comparative example 2 | Comparative example 3 | Comparative example 4 |
|---|---|---|---|---|
| (A') | | | | |
| Epiclon HP7200 | | | 82 | 32 |
| Epolight 4000 | | | | |
| (B') | | | | |
| Epikote 828 | 41 | 41 | | |
| Epikote 1001 | 41 | 41 | | |
| Epikote 807 | | | | 50 |
| Epiclon N740 | | | | |
| (D) | | | | |
| Newcol 707SF | 15 | 15 | 15 | 15 |
| Other | | | | |
| ISEO | 3 | 3 | 3 | 3 |
| Pluronic F88 | | | | |
| Concentration of sizing agent aqueous dispersion (% by weight) | 2.0 | 2.0 | 2.2 | 2.0 |
| Quantity of sizing agent bonded to carbon fiber (% by weight) | 0.9 | 0.9 | 1.2 | 0.9 |
| Performance of sizing agent aqueous dispersion during sizing | ○ | ○ | ○ | ○ |
| Type of matrix resin | #350 | #410 | #350 | #350 |
| Performance of carbon fiber bundle during prepreg production | ○ | ○ | ○ | ○ |
| External appearance of prepreg and absorption of resin | x | x | x | x |
| 90° bending strength of laminated sheet (MPa) | 143 | 139 | 140 | 146 |
| Heat resistance of laminated sheet: G'-Tg (° C.) | 121 | 190 | 120 | 122 |

INDUSTRIAL APPLICABILITY

As described above, a sizing agent for carbon fiber according to the present invention comprises epoxy compounds that cause carbon fiber reinforced composite materials, which have been produced with sized carbon fiber that has been treated with such a sizing agent as the reinforcing material, to exhibit excellent mechanical characteristics, and furthermore, the sizing agent comprises, as these epoxy group containing compounds, a good balance of a low surface energy component that promotes spreading wetting of the impregnating matrix resin onto the surface of the carbon fiber, and a co-solubility component that promotes the solubility of the sizing agent within the impregnating matrix resin. Accordingly, the sizing agent for carbon fiber provides the carbon fiber with excellent impregnation properties relative to a wide variety of matrix resins.

Furthermore, a sizing agent for carbon fiber according to the present invention that also contains an anionic surfactant with an aryloxy group as a hydrophobic group, with an ammonium ion as a counter ion, and with an alkylene oxide addition quantity of no more than 10 moles, causes no reduction in heat resistance, even for carbon fiber reinforced composite materials that use a heat resistant type resin as the matrix resin.

In addition, an aqueous dispersion of a sizing agent for carbon fiber according to the present invention is formed by dispersing an aforementioned sizing agent for carbon fiber in water using a surfactant, and consequently provides a sizing liquid for the sizing treatment of carbon fiber that offers excellent properties in terms of both industrial and safety factors, and moreover, because the dispersion displays favorable stability, it also offers excellent handling.

The invention claimed is:

1. A sizing agent for carbon fiber, comprising 100 parts by weight of a component (A) described below, and from 10 to 75 parts by weight of a component (B) described below, wherein a combined total of said component (A) and said component (P) accounts for at least 50% by weight of a combined weight of all components:

component (A): a compound with at least 1 epoxy group within each molecule, and with a surface energy at 125° C. of 17 to 34 mJ/m$^2$; and component (B): a compound with at least 1 epoxy group within each molecule, and with a surface energy at 125° C. of at least 35 mJ/m$^2$, further comprising from 8 to 30% by weight, relative to a combined weight of all components, of a component (D) formed from an anionic surfactant with an aryloxy group as a hydrophobic group, with an ammonium ion as a counter ion, and with an alkylene oxide addition quantity of no more than 10 moles, wherein said compound with an epoxy group that constitutes said component (A) is a component (A') formed from a compound with at least 2 epoxy groups within each molecule, and said compound with an epoxy group that constitutes said component (B) is a component (B') formed from a compound with at least 2 epoxy groups within each molecule.

2. An aqueous dispersion for carbon fiber sizing, produced by dispersing a sizing agent for carbon fiber according to claim 1 in water.

3. A sized carbon fiber, wherein a sizing agent for carbon fiber according to claim 1 is bonded to a surface of said carbon fiber.

4. A sized carbon fiber according to claim 3, wherein a quantity of said sizing agent for carbon fiber bonded to a surface of said carbon fiber is within a range from 1 to 5.0% by weight of said carbon fiber.

5. A sheet material that utilizes sized carbon fiber according to claim 3.

6. A carbon fiber reinforced composite material comprising a sheet material according to claim 5 as a reinforcing material.

7. A carbon fiber reinforced composite material according to claim 6, which is a molded body formed using RTM (resin transfer molding), VARTM (vacuum assisted resin transfer molding), or RI (resin infusion) methods.

8. A carbon fiber reinforced composite material comprising carbon fiber according to claim 3 as a reinforcing material.

9. A carbon fiber reinforced composite material according to claim 8, which is a molded body formed using RTM (resin transfer molding), VARTM (vacuum assisted resin transfer molding), or RI (resin infusion) methods.

10. A sized carbon fiber, wherein a sizing agent for carbon fiber is bonded to a surface of said carbon fiber, the sizing agent comprising 100 parts by weight of a component (A) described below, and from 10 to 75 parts by weight of a component (B) described below, wherein a combined total of said component (A) and said component (B) accounts for at least 50% by weight of a combined weight of all components:

component (A): a compound with at least 1 epoxy group within each molecule, and with a surface energy at 125° C. of 17 to 34 mJ/m$^2$; and component (B): a compound with at least 1 epoxy group within each molecule, and with a surface energy at 125° C. of at least 35 mJ/m$^2$.

11. A sized carbon fiber according to claim 10, wherein a quantity of said sizing agent for carbon fiber bonded to a surface of said carbon fiber is within a range from 1 to 5.0% by weight of said carbon fiber.

12. A sheet material that utilizes sized carbon fiber according to claim 10.

13. A carbon fiber reinforced composite material comprising a sheet material according to claim 12 as a reinforcing material.

14. A carbon fiber reinforced composite material according to claim 13, which is a molded body formed using RTM (resin transfer molding), VARTM (vacuum assisted resin transfer molding), or RI (resin infusion) methods.

15. A carbon fiber reinforced composite material comprising carbon fiber according to claim 10 as a reinforcing material.

16. A carbon fiber reinforced composite material according to claim 15, which is a molded body formed using RTM (resin transfer molding), VARTM (vacuum assisted resin transfer molding), or RI (resin infusion) methods.

* * * * *